US012596782B2

(12) United States Patent
Llamas Virgen et al.

(10) Patent No.: US 12,596,782 B2
(45) Date of Patent: Apr. 7, 2026

(54) CONTINUOUS AUTHENTICATION FOR A REAL TIME HOLOGRAM

(71) Applicant: INTERNATIONAL BUSINESS MACHINES CORPORATION, Armonk, NY (US)

(72) Inventors: Paul Llamas Virgen, Guadalajara (MX); Priyansh Jaiswal, Boca Raton, FL (US); Peeyush Jaiswal, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 711 days.

(21) Appl. No.: 17/822,558

(22) Filed: Aug. 26, 2022

(65) Prior Publication Data
US 2024/0070255 A1     Feb. 29, 2024

(51) Int. Cl.
| | |
|---|---|
| *G06F 21/00* | (2013.01) |
| *G03H 1/00* | (2006.01) |
| *G06F 21/44* | (2013.01) |

(52) U.S. Cl.
CPC ........... *G06F 21/44* (2013.01); *G03H 1/0011* (2013.01); *G03H 2001/0022* (2013.01)

(58) Field of Classification Search
CPC .................. G06F 21/44; G03H 1/0011; G03H 2001/0022
See application file for complete search history.

(56) References Cited

U.S. PATENT DOCUMENTS

| | | |
|---|---|---|
| 5,306,899 A | 4/1994 | Marom et al. |
| 5,422,744 A | 6/1995 | Katz et al. |
| 5,694,229 A | 12/1997 | Drinkwater et al. |

(Continued)

FOREIGN PATENT DOCUMENTS

| | | | | |
|---|---|---|---|---|
| WO | WO-2018236351 A1 | * | 12/2018 | ........... H04L 9/3226 |
| WO | WO-2023101033 A1 | * | 6/2023 | ............... G03H 1/00 |

OTHER PUBLICATIONS

Yuan, Sheng et al., "An Optical Authentication System Based on Encryption Technique and Multimodal Biometrics," Optics & Laser Technology 54 (2013): 120-127.

(Continued)

*Primary Examiner* — Rodman Alexander Mahmoudi
(74) *Attorney, Agent, or Firm* — Konrad, Raynes, Davda & Victor, LLP; Janaki K. Davda

(57) ABSTRACT

Provided are techniques for continuous authentication for a real time hologram. A request and a hologram are received, where the hologram is embedded with a first key phrase in accordance with a first sequence, and where the first sequence indicates which portions of the first key phrase are embedded in specific locations of the hologram. A first seed and a second seed are retrieved. A second key phrase is generated using the first seed. A second sequence is generated using the second seed. It is determined whether portions of the second key phrase are embedded in specific locations of the hologram in accordance with the second sequence. In response to determining that the portions of the second key phrase are embedded in specific locations of the hologram in accordance with the second sequence, the hologram is displayed, and the request is processed. Otherwise, the request is rejected.

20 Claims, 10 Drawing Sheets

(56)                    References Cited

U.S. PATENT DOCUMENTS

| | | | |
|---|---|---|---|
| 8,408,470 | B2 | 4/2013 | Komatsu et al. |
| 8,535,853 | B2 | 9/2013 | Naydenova et al. |
| 2018/0144160 | A1* | 5/2018 | Shirakura ............... G06K 7/10 |
| 2020/0380113 | A1* | 12/2020 | Bock ....................... G06F 21/44 |
| 2023/0017185 | A1* | 1/2023 | Cheong ............... G03H 1/0011 |

OTHER PUBLICATIONS

Mihailescu, Marius Iulian et al., "A Multi-Factor Authentication Scheme Including Biometric Characteristics as One Factor," Scientific Bulletin "Mircea cel Batran" Naval Academy 18, No. 1, 2015, 5 pages.

Verma, Gaurav et al., "Securing Information Using Optically Generated Biometric Keys," Journal of Optics 18, No. 11, 2016, 13 pages.

Dittmann, Jana et al., "Advanced Multimedia Security Solutions for Data and Owner Authentication," Applications of Digital Image Processing XXIV, vol. 4472, International Society for Optics and Photonics, 2001, pp. 132-143.

"Digital Holography Market", Markets and Markets Research Private LTD., 2009, pp. 10, retrieved from URL: https://www. marketsandmarkets.com/Market-Reports/digital-holography-market-136623896.html.

Marchand, Laura, "Holographic Pop Star Hatsune Miku to Perform Montreal Concert", CBC News, Jan. 31, 2020, pp. 4, retrieved from URL: https://www.cbc.ca/news/canada/montreal/hatsune miku-mtl-1.5445686.

Shieber, Jonathan, "Portl Hologram raises $3M to put a hologram machine in every home", TechCrunch, Oct. 29, 2020, pp. 11, retrieved from URL: https://techcrunch.com/2020/10/29/portl-hologram-raises-3m-to-put-a-hologram-machine-in-every-home/.

"About Proto", Proto Inc., 2022, pp. 2, retrieved from URL: https://www.portlhologram.com/.

Wikipedia, "Security Token", Jun. 2022, pp. 6, retrieved from URL: https://en.wikipedia.org/wiki/Security_token.

Mell, P. et al., "The NIST Definition of Cloud Computing (Draft)", Sep. 2011, Computer Security Division Information Technology Laboratory National Institute of Standards and Technology, Total 7 pp.

Mell, P. et al., "Effectively and Securely Using the Cloud Computing Paradigm", [online], Oct. 7, 2009, retrieved from URL: http://csrc.nist.gov/groups/SNS/cloud-computing/cloud-computing-v26.ppt, Total 80 pp.

Wikipedia, "Key Generation", Jul. 2022, pp. 2, retrieved from URL: https://en.wikipedia.org/wiki/Key_generation.

* cited by examiner

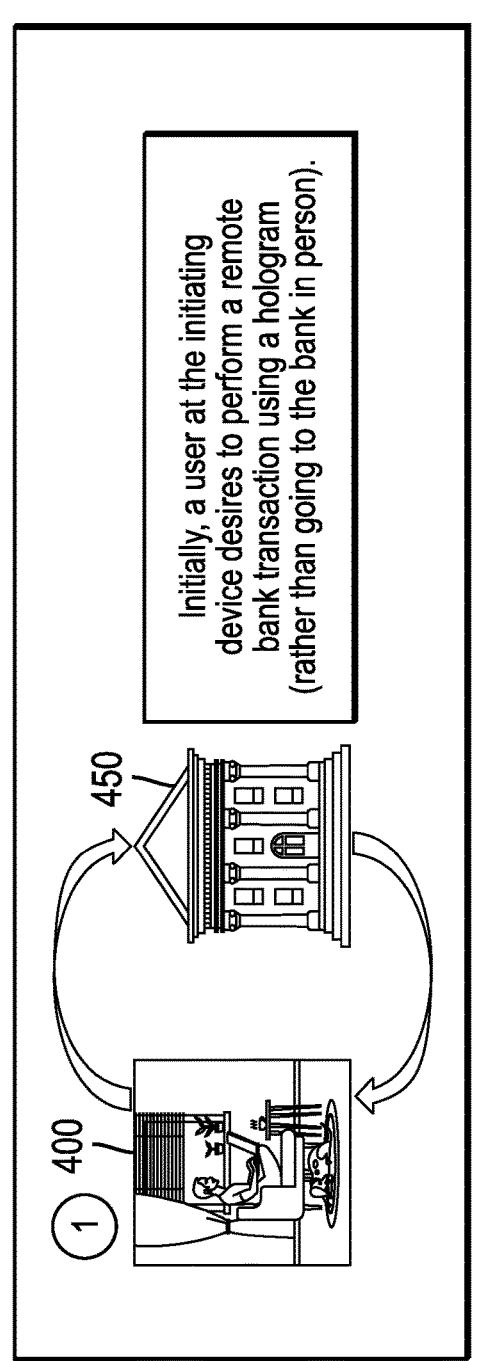

Initially, a user at the initiating device desires to perform a remote bank transaction using a hologram (rather than going to the bank in person).

FIG. 4A

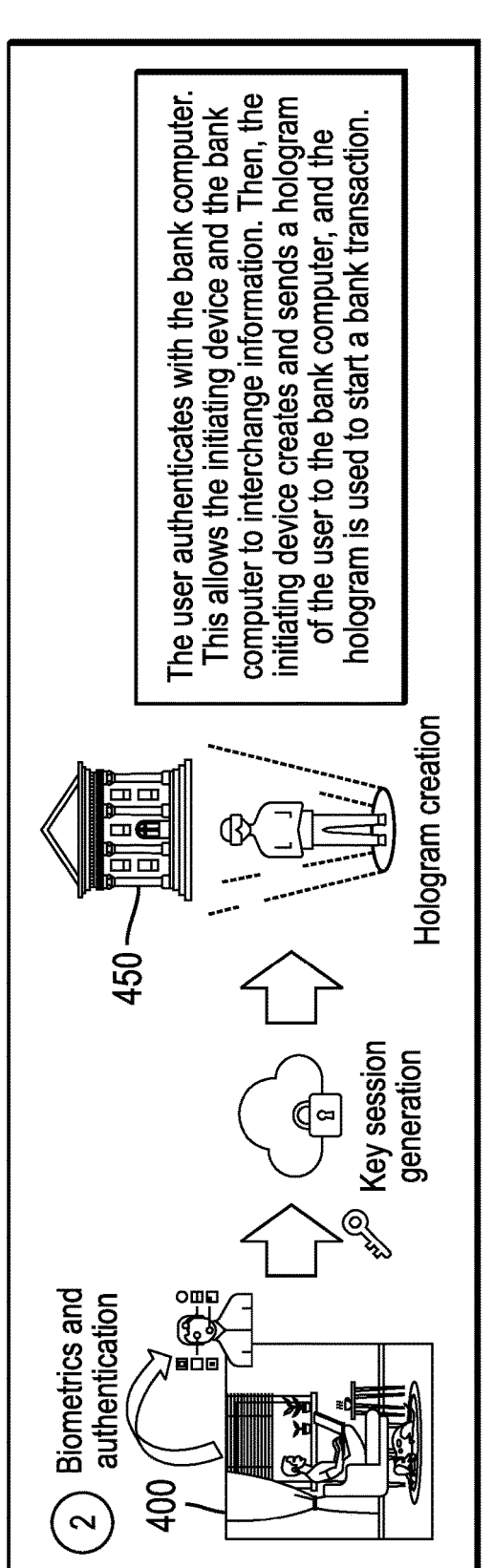

The user authenticates with the bank computer. This allows the initiating device and the bank computer to interchange information. Then, the initiating device creates and sends a hologram of the user to the bank computer, and the hologram is used to start a bank transaction.

FIG. 4B

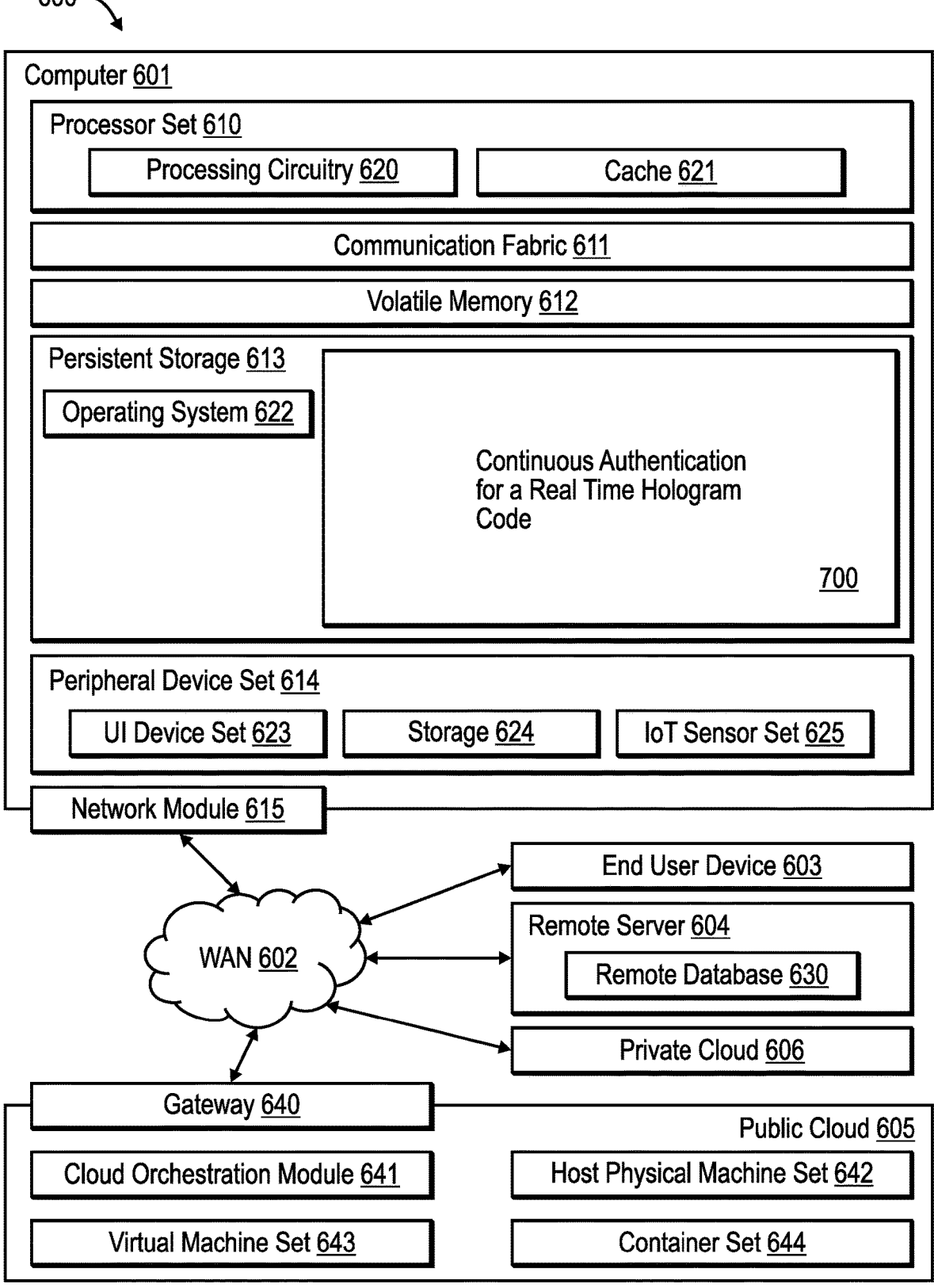

600

Computer 601

Processor Set 610
Processing Circuitry 620          Cache 621

Communication Fabric 611

Volatile Memory 612

Persistent Storage 613
Operating System 622

Continuous Authentication
for a Real Time Hologram
Code

700

Peripheral Device Set 614
UI Device Set 623          Storage 624          IoT Sensor Set 625

Network Module 615

WAN 602

End User Device 603

Remote Server 604
Remote Database 630

Private Cloud 606

Gateway 640

Public Cloud 605

Cloud Orchestration Module 641          Host Physical Machine Set 642

Virtual Machine Set 643          Container Set 644

FIG. 6

CONTINUOUS AUTHENTICATION FOR A REAL TIME HOLOGRAM

BACKGROUND

Embodiments of the invention relate to continuous authentication for a real time hologram, where the hologram is regenerated periodically by embedding portions of a key phrase into locations of the hologram in accordance with a particular sequence.

A hologram (or holographic figure) may be described as a three-dimensional image formed by light beams from light source (e.g., lasers). A hologram may be used to do business in a virtual world or meta verse. Holograms are now also being used in the real world.

Some companies are providing new ways to use holograms as a new normal in interacting with the real world. As an example, a company is releasing a new hologram box to enable people to generate a hologram. For example, a real world singer may generate a comic character's hologram and present that hologram to give a concert to real world fans (without the real world singer being physically present before the real world fans).

SUMMARY

In accordance with certain embodiments, a computer-implemented method is provided for continuous authentication for a real time hologram. The computer-implemented method comprises operations. In such embodiments, a request and a hologram are received, where the hologram is embedded with a first key phrase in accordance with a first sequence, and where the first sequence indicates which portions of the first key phrase are embedded in specific locations of the hologram. A first seed and a second seed are retrieved. A second key phrase is generated using the first seed. A second sequence is generated using the second seed. It is determined whether portions of the second key phrase are embedded in specific locations of the hologram in accordance with the second sequence. In response to determining that the portions of the second key phrase are embedded in specific locations of the hologram in accordance with the second sequence, the hologram is displayed, and the request is processed. In response to determining that the portions of the second key phrase are not embedded in specific locations of the hologram in accordance with the second sequence, the request is rejected.

In accordance with other embodiments, a computer program product is provided for continuous authentication for a real time hologram. The computer program product comprises a computer readable storage medium having program code embodied therewith, the program code executable by at least one processor to perform operations. In such embodiments, a request and a hologram are received, where the hologram is embedded with a first key phrase in accordance with a first sequence, and where the first sequence indicates which portions of the first key phrase are embedded in specific locations of the hologram. A first seed and a second seed are retrieved. A second key phrase is generated using the first seed. A second sequence is generated using the second seed. It is determined whether portions of the second key phrase are embedded in specific locations of the hologram in accordance with the second sequence. In response to determining that the portions of the second key phrase are embedded in specific locations of the hologram in accordance with the second sequence, the hologram is displayed, and the request is processed. In response to determining that the portions of the second key phrase are not embedded in specific locations of the hologram in accordance with the second sequence, the request is rejected.

In accordance with yet other embodiments, a computer system is provided for continuous authentication for a real time hologram. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. In such embodiments, a request and a hologram are received, where the hologram is embedded with a first key phrase in accordance with a first sequence, and where the first sequence indicates which portions of the first key phrase are embedded in specific locations of the hologram. A first seed and a second seed are retrieved. A second key phrase is generated using the first seed. A second sequence is generated using the second seed. It is determined whether portions of the second key phrase are embedded in specific locations of the hologram in accordance with the second sequence. In response to determining that the portions of the second key phrase are embedded in specific locations of the hologram in accordance with the second sequence, the hologram is displayed, and the request is processed. In response to determining that the portions of the second key phrase are not embedded in specific locations of the hologram in accordance with the second sequence, the request is rejected.

These embodiments of the invention advantageously authenticate a hologram continuously to avoid fraudulent use of the hologram.

In additional embodiments, it is determined that it is time to generate a new hologram. A new key phrase is generated using the first seed. A new sequence is generated using the second seed. A new hologram is received. The new hologram is authenticated by determining that portions of the new key phrase are embedded in specific locations of the new hologram in accordance with the new sequence. This advantageously allows for the new hologram to be authenticated to prevent fraud.

In yet additional embodiments, the hologram is associated with a user, and the request and the hologram are received at a remote device that is geographically remote from the user. This advantageously allows a user to use a hologram at a remote location.

In more embodiments, a user is authenticated with biometrics associated with the user, where the hologram is associated with the user. This advantageously allows for authenticating the user in addition to authenticating the hologram.

In yet more embodiments, the hologram is periodically regenerated. This advantageously allows for the hologram to be regenerated periodically to assist in detecting fraud.

In further embodiments, the first seed and the second seed are generated by a cloud service of a cloud node. This advantageously allows for the first seed and the second seed to be generated off-line.

In yet further embodiments, other requests are processed while the hologram is authenticated. This advantageously allows for multiple requests to be processed based on one authentication of a hologram.

BRIEF DESCRIPTION OF THE SEVERAL VIEWS OF THE DRAWINGS

Referring now to the drawings in which like reference numbers represent corresponding parts throughout:

FIGS. 4A, 4B, and 4C illustrate an example in which a hologram is used to perform a bank transaction in accordance with certain embodiments.

FIG. 6 illustrates a computing environment in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments let a person remotely use a real time hologram to perform actions, while providing continuous authentication for the real time hologram.

Using a hologram in the real world may lead to security issues for consumers and companies. For instance, if an account holder (person) of a bank uses a hologram to represent that person at a bank, embodiments allow the bank to authenticate the account holder using the hologram, and the authentication is continuous during the period that the account holder is performing a transaction at the bank. With embodiments, in terms of security, the bank is able to determine that the hologram represents the account holder (who is authorized to perform the transaction at the bank) and is not a fraudulent hologram (i.e., a hologram used by a person who is not authorized to perform the transaction at the bank). In addition, the hologram is periodically regenerated in real time. Thus, embodiments advantageously provide continuous authentication of the real time hologram to prevent fraud.

Figure 1:
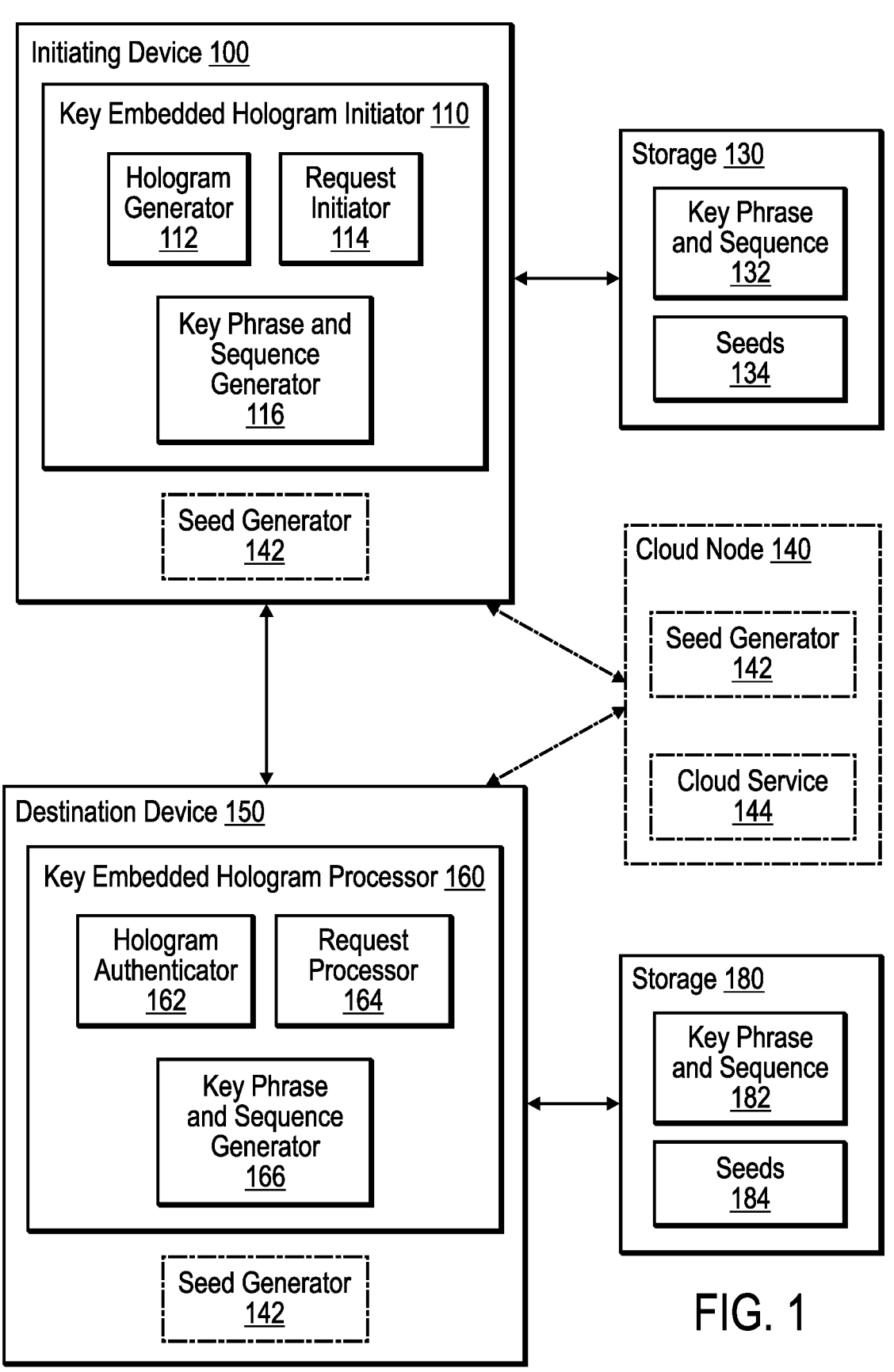
FIG. 1 illustrates, in a block diagram, a computing environment in accordance with certain embodiments.

FIG. 1 illustrates, in a block diagram, a computing environment in accordance with certain embodiments. In FIG. 1, an initiating device 100 is connected to a destination device 150.

In certain embodiments, both the initiating device 100 and the destination device 150 are connected to a cloud node 140. The cloud node 140 includes a seed generator 142 and at least one cloud service 144. In certain embodiments, the seed generator 142 generates a first seed and a second seed and sends these to the initiating device 100 and the destination device 150. In another embodiment, if the initiating device 100 generates the first seed and the second seed, the initiating device 100 sends the first seed and the second seed to the destination device 150. In yet another embodiments, if the destination device 150 generates the first seed and the second seed, the initiating device 100 sends the first seed and the second seed to the initiating device 100. Thus, both the initiating device 100 and the destination device 150 store and use the first seed and the second seed. The first seed may be described as a key phrase seed, while the second seed may be described as a sequence seed.

The initiating device 100 includes a key embedded hologram initiator 110, which includes a hologram generator 112, a request initiator 114, and a key phrase and sequence generator 116. The initiating device 100 is connected to storage 130, which stores a key phrase and a sequence 132 and seeds 134. The seeds 134 include at least a first seed for generating the key phrase and a second seed for generating the sequence.

In certain embodiments, the initiating device 100 is a smart phone, a tablet computer, a desktop computer, a lap top computer, an Internet of Things (IoT) device, or any device with computer processing capabilities. In certain embodiments, the key phrase may be a key (from a public key/private key pair), a code, a token, a password, multiple keys, etc. With embodiments, the key phrase is made up of a plurality of characters or phrases. The sequence indicates which portion of the key (i.e., which characters or phrases) should be embedded into which location of the hologram (e.g., the first four characters of the key are to be embedded into the eye (location) of the hologram, the next three characters of the key are to be embedded into the forehead (location) of the hologram, etc.). In certain embodiments, the key phrase includes multiple keys, and the sequence indicates which key of the multiple keys is to be embedded in a specific location of the hologram.

The hologram generator 112 generates the hologram by embedding (or integrating) the key phrase into different locations of the hologram in accordance with the sequence. The request initiator 114 sends the hologram with the embedded key and one or more requests to the destination device 150 (e.g., to perform a banking transaction).

In certain embodiments, the hologram represents a human user who would like to send the hologram as a representative to a destination that is remote from the human user. In certain embodiments, the hologram resembles the user. In other embodiments, the hologram may be another representation (e.g., an avatar, an animal, a character (e.g., from a comic book), etc.) associated with the user, such that the destination device recognizes the hologram as being associated with that user.

The destination device 150 includes a key embedded hologram processor 160, which includes a hologram authenticator 162, a request processor 164, and a key phrase and sequence generator 166. The destination device 150 is connected to storage 180, which stores a key phrase and a sequence 182 and seeds 184. The seeds 184 include at least a first seed for generating the key phrase and a second seed for generating the sequence. In certain embodiments, the destination device 150 is a smart phone, a tablet computer, a desktop computer, a lap top computer, an Internet of Things (IoT) device, or any device with computer processing capabilities. In certain embodiments, the key phrase may be a key (from a public key/private key pair, a code, a token, a password, multiple keys, etc. The sequence indicates which portion of the key should be embedded into which location of the hologram (e.g., the first four characters of the key are to be embedded into the eye (location) of the hologram, the next three characters of the key are to be embedded into the forehead (location) of the hologram, etc.). With embodiments, the initiating device 100 and the destination device 150 each generate the same key phrase and the same sequence based on receiving the same first seed and second seed.

In certain embodiments using a public key/private key pair, the initiating device 100 encrypts the key phrase with a public key and sends this to the destination device 150, and the destination device 150 decrpyts the key phrase with a private key to obtain the key phrase that was used to create the hologram.

The request processor 164 receives the hologram and one or more requests (e.g., to perform a banking transaction) and uses the hologram authenticator 162 to authenticate the hologram by determining whether the key phrase is embedded into the hologram in accordance with the sequence (e.g., the first four characters of the key phrase are to be embedded into the eye of the hologram, the next three characters of the key phrase are to be embedded into the forehead of the hologram, etc.). The hologram is authenticated if the key phrase is embedded into locations of the hologram in accordance with the sequence, otherwise, the hologram is not authenticated. If the hologram is authenticated, the request processor 164 processes requests from the request initiator 114. While the request initiator 114 and the request processor 164 are interacting, the hologram authenticator 162 continuously authenticates the hologram (e.g., authenticates the hologram periodically, such as every 5 seconds) as the hologram is periodically regenerated using a new key phrase and a new sequence. The period for regenerating and authenticating the hologram may be customizable for each destination device 150.

With embodiments, the real time continuous authentication of a hologram includes embedding the key phrase into the hologram in accordance with the sequence by offline generation. The key phrase and the sequence may be generated offline using the seeds stored on the initiating device 100 and the destination device 150 (which may be referred to as trusted devices). The hologram generator 112 performs dynamic embedding of the key phrase into the hologram. Certain embodiments include offline dynamic generation of the key phrase using an offline token seed, which may be provided by the destination device 150 or by the cloud node 140. Other embodiments include offline dynamic generation of the key phrase from a first offline token seed and of the sequence from a second offline token seed, where the first token seed and the second token seed may be provided by the destination device 150 or the cloud node 140. In certain embodiments, the first offline token seed and the second offline token seed may be generated once at set-up (e.g., after authentication between the initiating device 100 and the destination device 150).

Figure 2A:
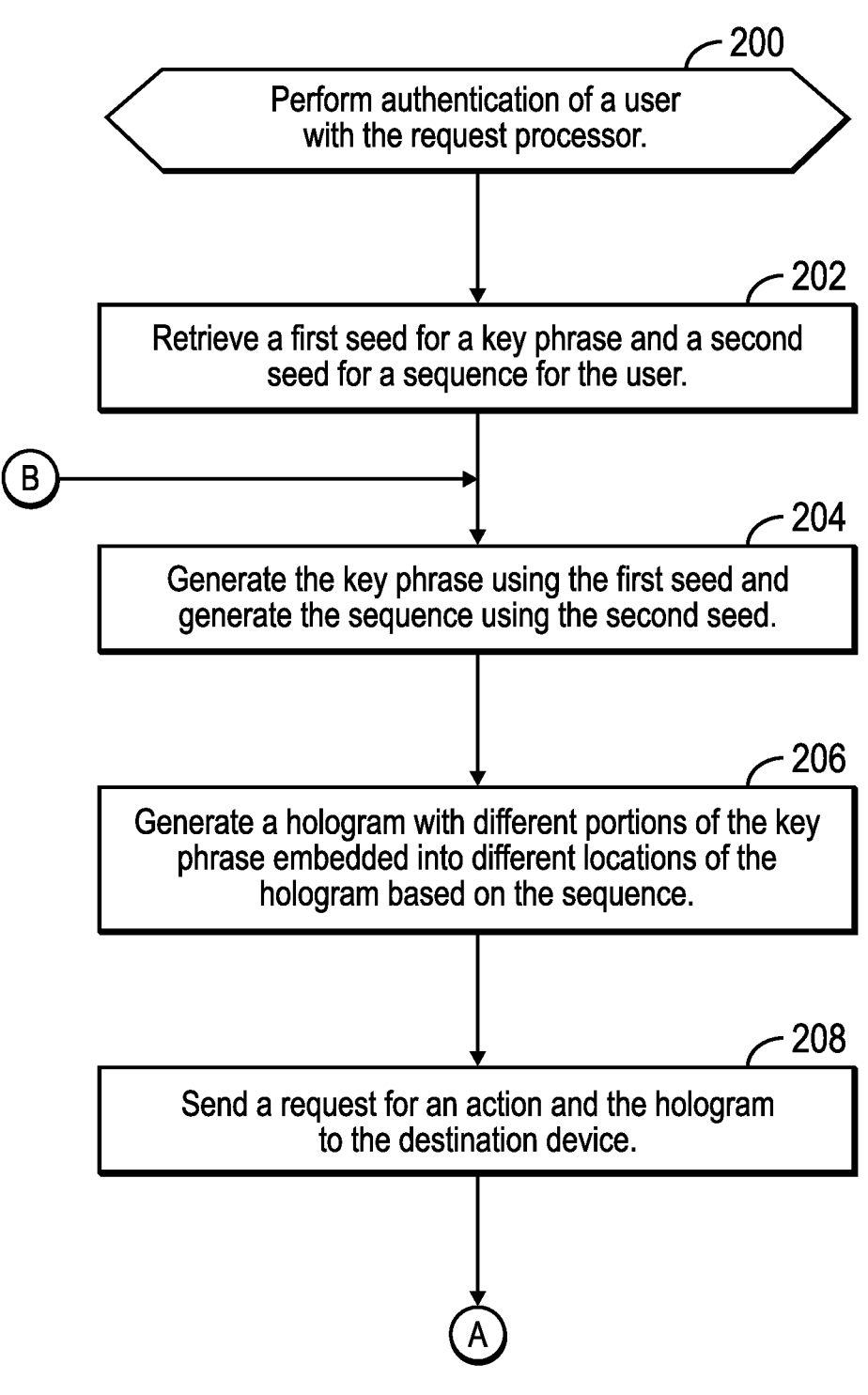
FIGS. 2A and 2B illustrate, in a flowchart, operations for generating a hologram in accordance with certain embodiments.
Figure 2B:
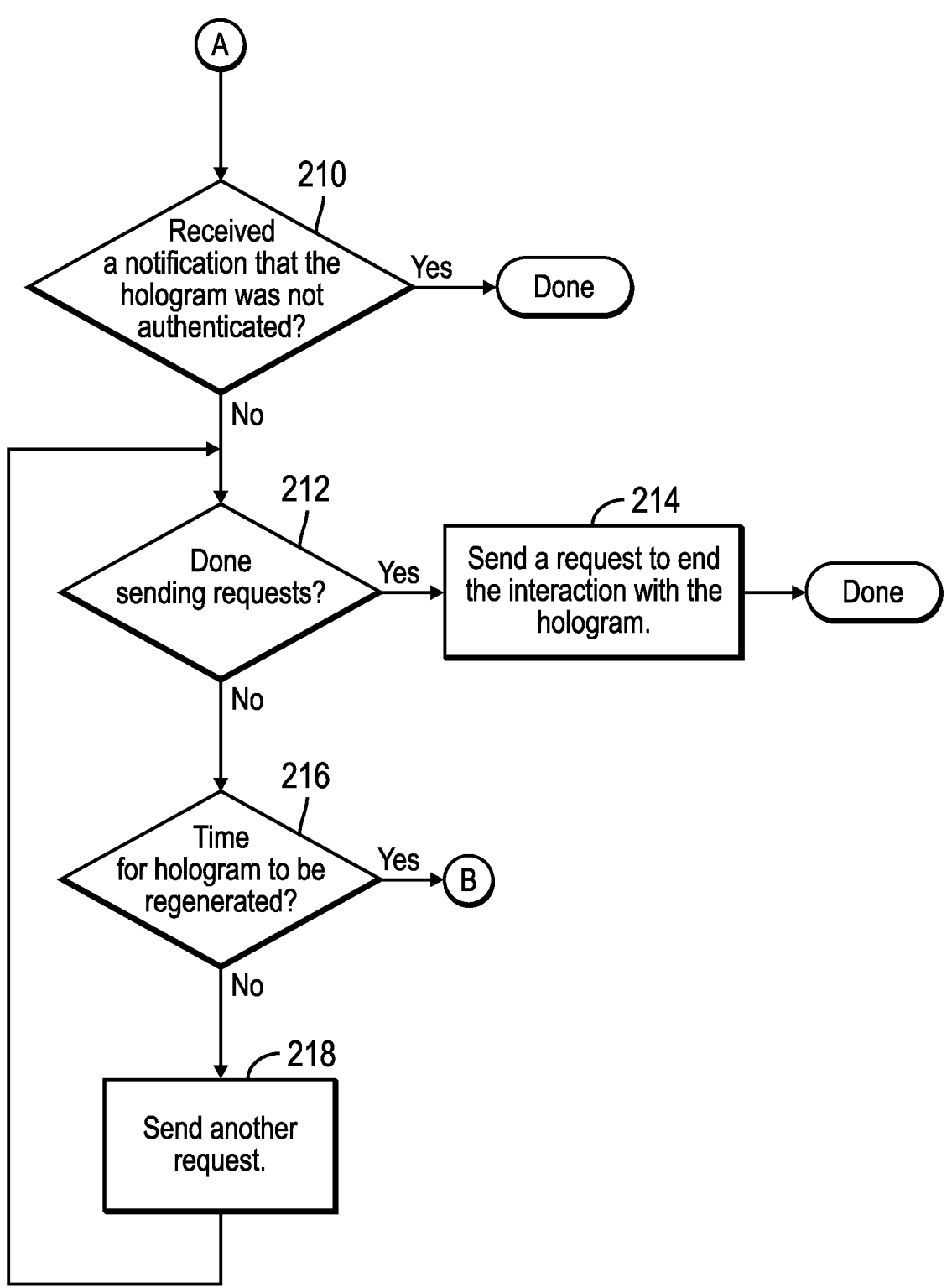

FIGS. 2A and 2B illustrate, in a flowchart, operations for generating a hologram in accordance with certain embodiments. Control begins at block 200 with the request initiator 114 of the key embedded hologram initiator 110 of the initiating device 100 performing authentication of a user with a request processor 164 of the key embedded hologram processor 160 of the destination device 150. In certain embodiments, the authentication may use biometrics (e.g., face scan, retina scan, fingerprint scan, etc.).

In block 202, the key phrase and sequence generator 116 of the key embedded hologram initiator 110 retrieves a first seed for a key phrase and a second seed for a sequence for the user. With embodiments, each user has an associated first seed and a second seed. In other embodiments, a group of users may be associated with the first seed and the second seed.

In various embodiments, the initiating device 100, the cloud node 140 or the destination device 150 may generate the first seed and the second seed using a seed generator 142. If the cloud node 140 generates the first seed and the second seed, the cloud node 140 sends the first seed and the second seed to the initiating device 100 and the destination device 150. If the initiating device 100 generates the first seed and the second seed, the initiating device 100 sends the first seed and the second seed to the destination device 150 and, optionally, to the cloud node 140. If the destination device 150 generates the first seed and the second seed, the initiating device 100 sends the first seed and the second seed to the initiating device 100 and, optionally, to the cloud node 140. In certain embodiments, the first seed and the second seed are received and stored by the initiating device 100 and the destination device 150 before any authentication (block 200) occurs. With these embodiments, the hologram generator 112 has access to the first seed and the second seed for generating the key phrase and the sequence in real time and generating the hologram in real time using the key phrase and the sequence.

In block 204, the key phrase and sequence generator 116 generates the key phrase using the first seed and generates the sequence using the second seed. These may be referred to as the first key phrase and first sequence or as the initiator key phrase and the initiator sequence as they are generated at the initiating device 100.

In block 206, the hologram generator 112 of the key embedded hologram initiator 110 generates a hologram with different portions of the key phrase embedded into different locations of the hologram based on the sequence. In certain embodiments, the hologram generator 112 creates a pattern based on the key phrase and injects that pattern into the actual hologram, so that the pattern may be described as "DNA" (Deoxyribonucleic Acid) for the hologram. The pattern may be based on the sequence, which indicates the portions of the key phrase that are to be injected into particular locations (e.g., eye, arm, neck, etc.) of the hologram.

In block 208, the request initiator 114 sends a request for an action and the hologram to the request processor 164 of the key embedded hologram processor 160 of the destination device 150. For example, a user may want to use a hologram to perform a bank transaction at a remote bank (i.e., remote from the user) or for some other specific purpose. The bank transaction may include one or more actions associated with one or more requests. A user may use the hologram at a concert venue, a geofence, a commercial location, a public park, etc. A geofence may be described as an area defined by perimeters (e.g., a location at a park or concert hall). In certain embodiments, the commercial space is a commercial location (i.e., a destination location at which the hologram is to be displayed, such as a bank, a store, a concert hall). From block 208 (FIG. 2A), processing continues to block 210 (FIG. 2B).

In block 210, the request initiator 114 determines whether a notification was received that the hologram was not authenticated. If so, processing is done, otherwise, processing continues to block 212. In certain embodiments, if the hologram was not authenticated, the request initiator 114 regenerates the hologram and tries sending the request and the hologram again.

In block 212, the request initiator 114 determines whether the user is done sending requests. If so, processing continues to block 214, otherwise, processing continues to block 216.

The determination of block 212 may be made in response to user input indicating that there are no more actions to be performed via the hologram.

In block 214, the request initiator 114 sends a request to end the interaction with the hologram to the request processor 164.

In block 216, the request initiator 114 determines whether it is time for the hologram to be regenerated. If so, processing continues to block 204, otherwise, processing continues to block 218. With this iteration going back to block 204, the key phrase and sequence generator 116 generates a new key phrase from the first seed and a new sequence from the second seed.

In block 218, the request initiator 114 sends another request to the request processor 164. From block 218, processing continues to block 212.

In certain embodiments, the destination device 150 determines that the initiating device 100 is a trusted device (e.g., based on prior interaction history with the initiating device 100, by a list of trusted devices, etc.) with a request initiator 114 for communicating with the request processor 164 and sends the first seed and the second seed to the initiating device 100. In other embodiments, the destination device 150 determines that the initiating device 100 is a trusted that with a request initiator 114 for communicating with the request processor 164 and sends one or more public keys and a sequence to the initiating device 100.

In certain embodiments, after validating a user's authenticity by biometrics and/or other mechanisms, a request is opened (initiated) for creating a new public/private key pair. With this, the seed generator 142 of the destination device 150 creates the new public/private key pair and sends the public key to the initiating device 100, which is associated with the first seed at the initiating device 100. In certain embodiments, a random, second seed is used to generate the sequence, which identifies one or more locations in the hologram. In certain embodiments, the request initiator 114 embeds the key phrase into the hologram in accordance with the sequence. The request processor 164 decrypts the key phrase using the private key and uses the decrypted key phrase and sequence to validate the hologram. In certain embodiments using a geofence or a commercial space, the private information (e.g., the private key) is stored on the cloud.

Figure 3A:
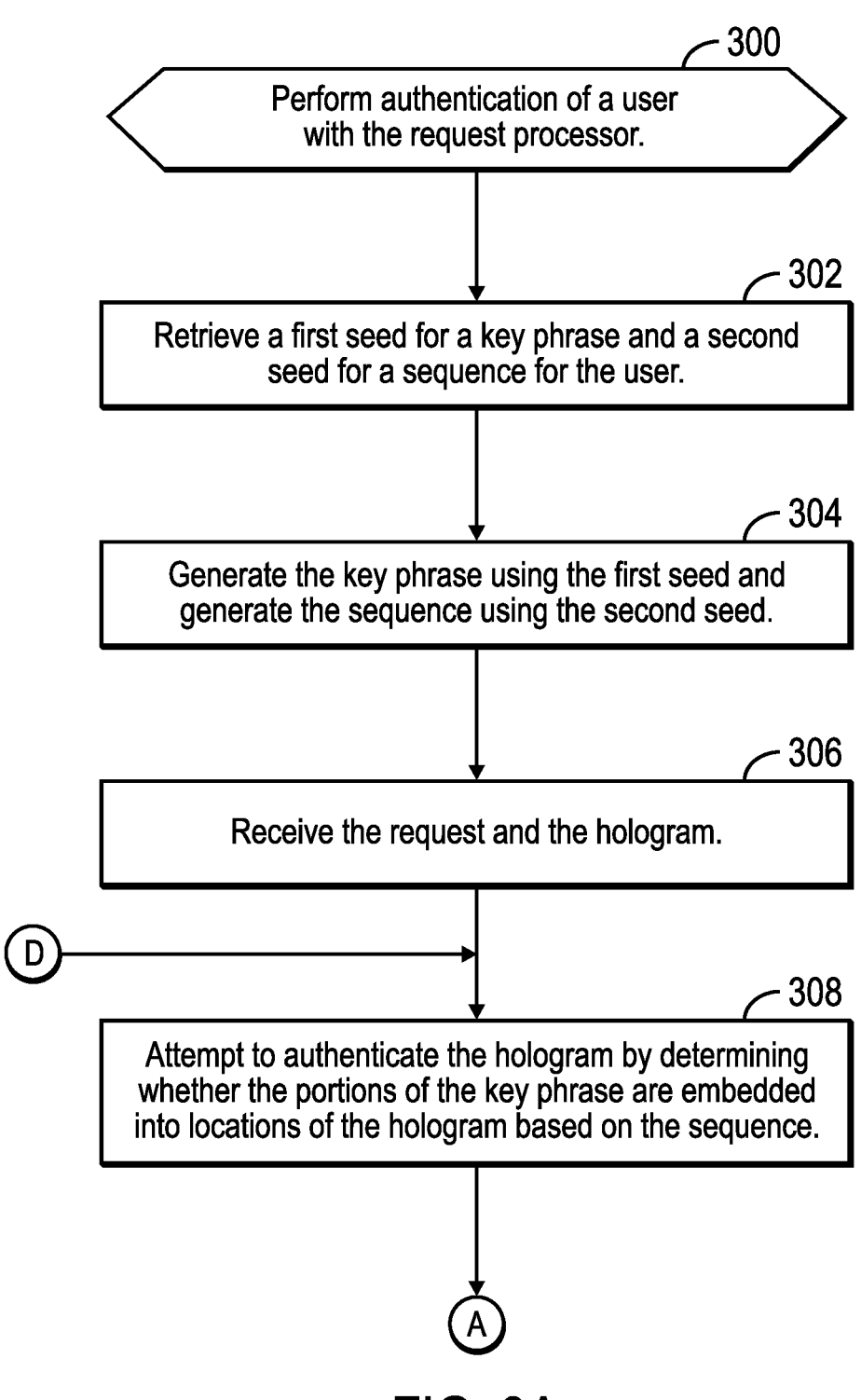
FIGS. 3A, 3B, and 3C illustrate, in a flowchart, operations for continuous authentication of a hologram dynamically generated in real time in accordance with certain embodiments.
Figure 3B:
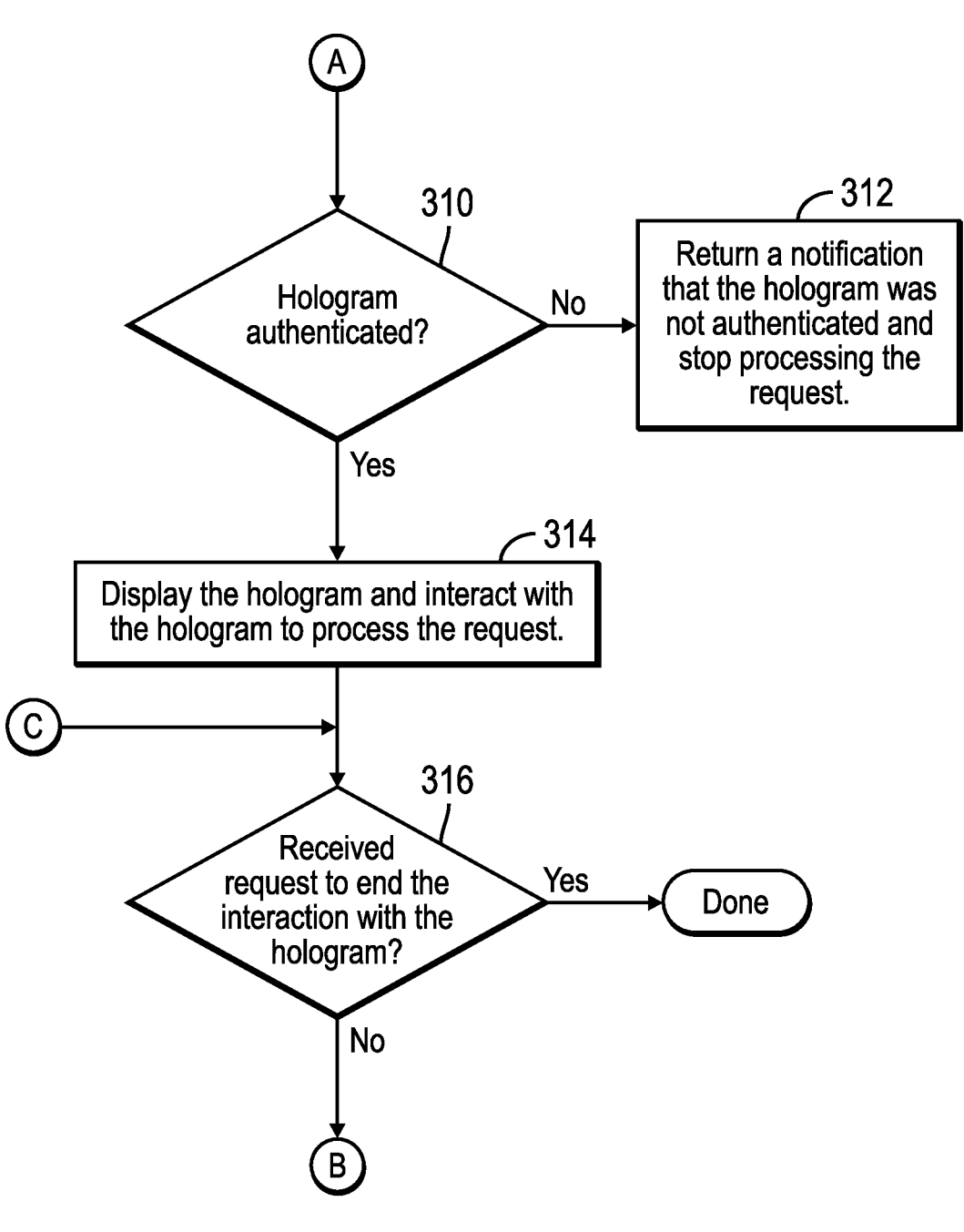

FIGS. 3A and 3B illustrate, in a flowchart, operations for continuous authentication of a hologram dynamically generated in real time in accordance with certain embodiments. Control begins at block 300 with the request processor 164 of the key embedded hologram processor 160 of the destination device 150 performing authentication of the user with the request initiator 114 of the key embedded hologram initiator 110 of the initiating device 100. In certain embodiments, the authentication may use biometrics (e.g., face scan, retina scan, fingerprint scan, etc.).

In block 302, the key phrase and sequence generator 166 of the key embedded hologram processor 160 retrieves a first seed for a key phrase and a second seed for a sequence for the user. With embodiments, each user has an associated first seed and a second seed. In other embodiments, a group of users may be associated with the first seed and the second seed.

In various embodiments, the initiating device 100, the cloud node 140 or the destination device 150 may generate the first seed and the second seed using a seed generator 142. If the cloud node 140 generates the first seed and the second seed, the cloud node 140 sends the first seed and the second seed to the initiating device 100 and the destination device 150. If the initiating device 100 generates the first seed and the second seed, the initiating device 100 sends the first seed and the second seed to the destination device 150 and, optionally, to the cloud node 140. If the destination device 150 generates the first seed and the second seed, the initiating device 100 sends the first seed and the second seed to the initiating device 100 and, optionally, to the cloud node 140. In certain embodiments, the first seed and the second seed are received and stored by the initiating device 100 and the destination device 150 before any authentication (block 300) occurs. With these embodiments, the hologram authenticator 162 has access to the first seed and the second seed for generating the key phrase and the sequence in real time and authenticating the hologram in real time using the key phrase and the sequence.

In block 304, the key phrase and sequence generator 166 generates the key phrase using the first seed and generates the sequence using the second seed. These may be referred to as the second key phrase and second sequence or as the destination key phrase and the destination sequence as they are generated at the initiating device 100.

In block 306, the request processor 164 of the key embedded hologram processor 160 receives the request and the hologram from the request initiator 114 of the key embedded hologram initiator 110.

In block 308, the hologram authenticator 162 of the key embedded hologram processor 160 attempts to authenticate the hologram by determining whether the portions of the key phrase (generated by the key phrase and sequence generator 166) are embedded into locations of the hologram based on the sequence (generated by the key phrase and sequence generator 166). Thus, with embodiments, if the key phrase and sequence generated by the key phrase and sequence generator 166 match the key phrase and sequence generated by the key phrase and sequence generator 116, then the hologram is authenticated. From block 308 (FIG. 3A), processing continues to block 310 (FIG. 3B).

In block 310, the hologram authenticator 162 determines whether the hologram was authenticated. If so, processing continues to block 314, otherwise, processing continues to block 312.

The hologram is authenticated when the key phrase is embedded in the hologram in accordance with the sequence. In this manner, even if a user who is not authorized to use the hologram sends the hologram (without the key phrase embedded in accordance with the sequence), the hologram will not be authenticated.

In block 312, the request processor 164 returns a notification to the request initiator 114 that the hologram was not authenticated and stop processing the request.

In block 314, the request processor 164 displays the hologram and interacts with the hologram to process the request.

Figure 3C:
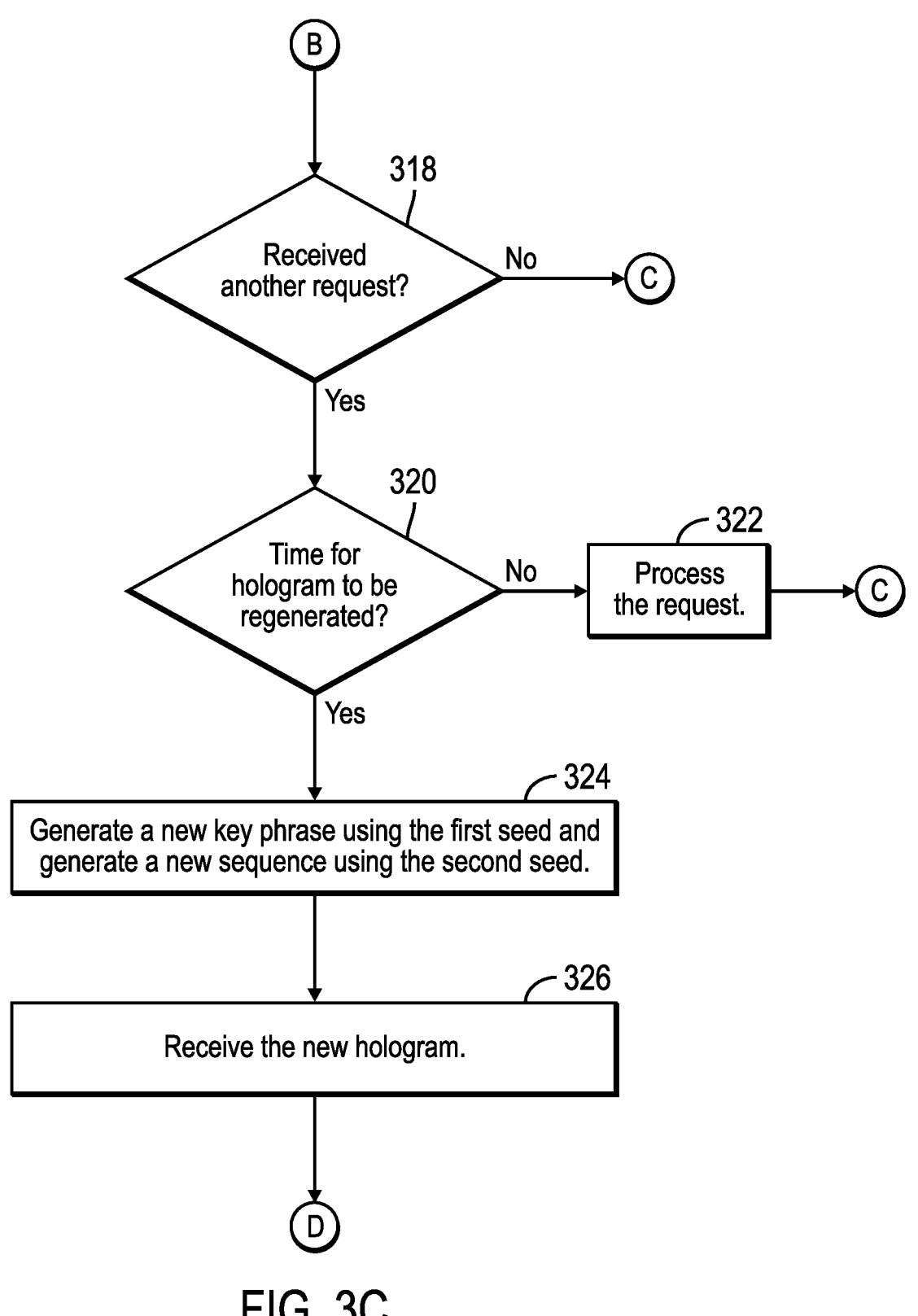

In block 316, the request processor 164 determines whether a request to end the interaction with the hologram has been received. This is in the case in which there are no more requests to process from the user using the hologram. If the request to end the interaction has been received from the request initiator 114, processing ends, otherwise, processing continues to block 318 (FIG. 3C). In certain embodiments, if the request to end the interaction has been received from the request initiator 114, the request processor 164 returns a notification that the interaction with the hologram is ending.

In block 318, the request processor 164 determines whether another request has been received. If so, processing continues to block 320, otherwise, processing continues to block 316.

In block 320, the request processor 164 determines whether it is time for the hologram to be regenerated. If so, processing continues to block 324, otherwise, processing continues to block 322.

In block 322, the request processor processes the request and processing continues to block 316.

In block 324, the key phrase and sequence generator 166 generates a new key phrase using the first seed and generates a new sequence using the second seed.

In block 326, the request processor 164 receives a new hologram from the request initiator 114 and processing continues to block 308. When processing returns to block 308, the hologram authenticator 162 attempts to authenticate the new hologram by determining whether the portions of the new key phrase (generated by the key phrase and sequence generator 166) are embedded into locations of the new hologram based on the new sequence (generated by the key phrase and sequence generator 166).

In certain embodiments, the cloud service 144 at the cloud node 140 sets up a time window for the hologram to be regenerated (with a new key phrase and a new sequence) and notifies the key embedded hologram initiator 110 and the key embedded hologram processor 160 that it is time to regenerate the hologram.

In certain embodiments, cameras at the destination device 150 are used by the hologram authenticator 162 to look at the hologram and decrypt the information (i.e., determine that the portions of the key phrase are in the expected locations of the hologram based on the sequence).

In case there is a problem with the authentication or continuous verification, then the key embedded hologram processor 160 closes the connection with the key embedded hologram initiator 110. Then, if desired, the user may start over with the processing of FIGS. 2A and 2B.

Figure 4C:
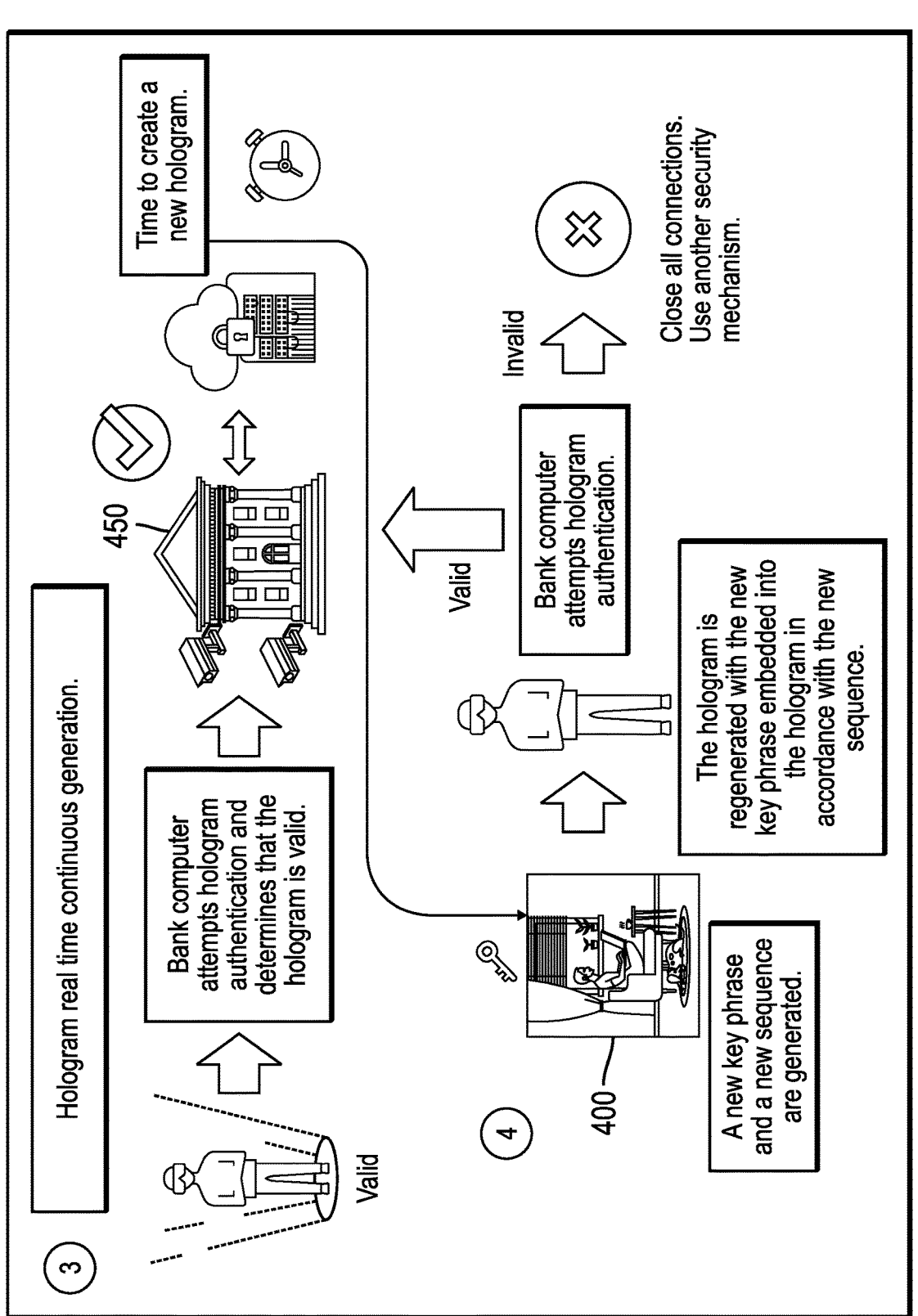

FIGS. 4A, 4B, and 4C illustrate an example in which a hologram is used to perform a bank transaction in accordance with certain embodiments. In FIG. 4A, initially, a user at the initiating device 400 desires to perform a remote bank transaction using a hologram (rather than going to the bank in person). In FIG. 4B, the user, via the initiating device 400, authenticates with the bank computer 450 (which is a destination device). This allows the initiating device 400 and the bank computer 450 to interchange information. Then, the initiating device 400 creates and sends a hologram of the user to the bank computer 450, and the hologram is used to start a bank transaction. In FIG. 4C, the bank computer 450 attempts authentication of the hologram and determines that the hologram is valid based on the key being embedded in the hologram pattern in accordance with the sequence. Also, in FIG. 4C, it is time to generate a new hologram. In FIG. 4C, the initiating device 400 uses a new key phrase and a new sequence to generate a new hologram, which is sent to the bank computer 450. In this example, the bank computer 450 generates its own new key phrase and new sequence and attempts authentication of the new hologram. If the new hologram is authenticated (valid), then the bank computer 450 continues processing requests. If the new hologram is not authenticated (invalid), the bank computer 450 but the bank computer 450 is not able to authenticate the hologram and ends the connection to the initiating device 400.

Figure 5:
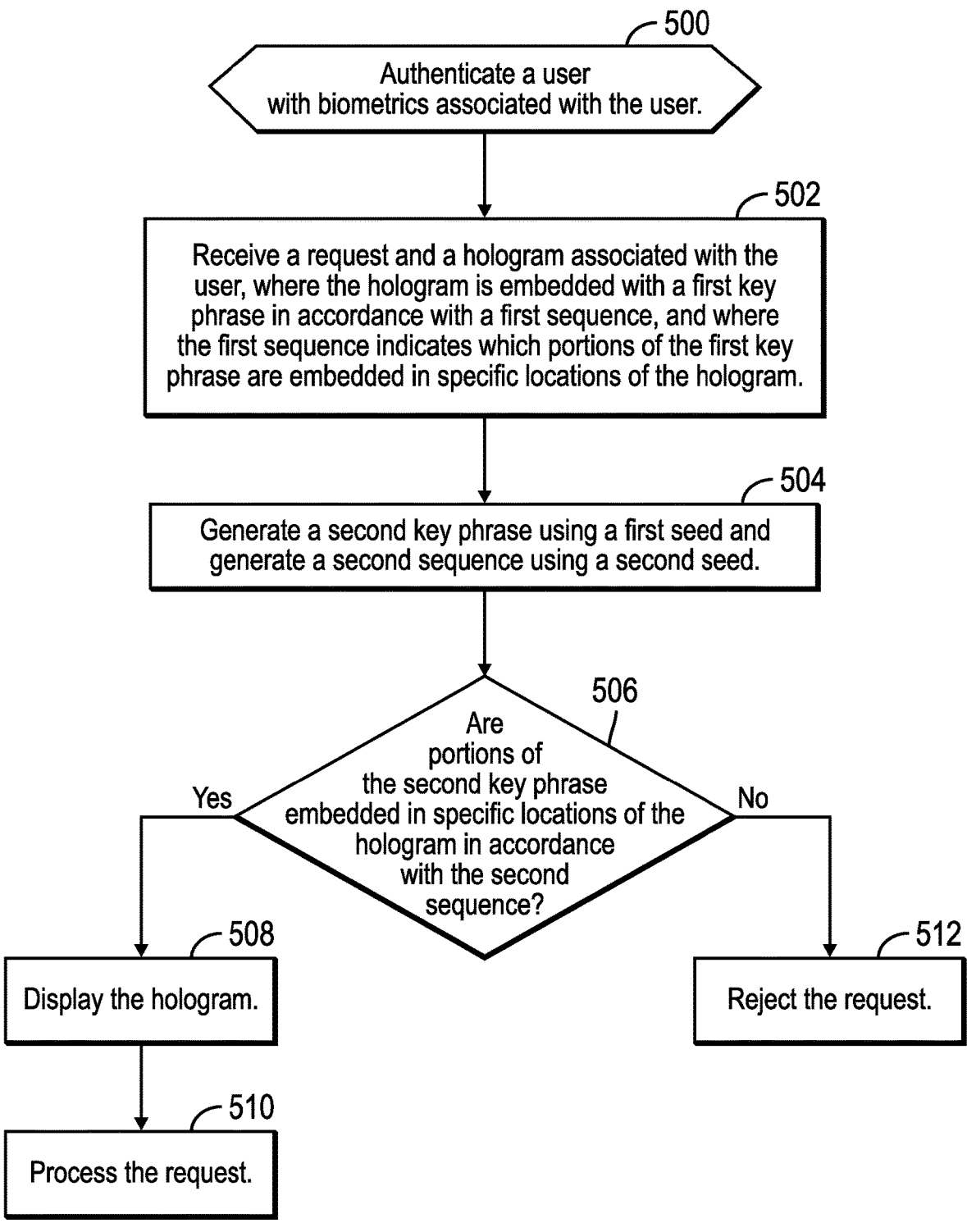
FIG. 5 illustrates, in a flowchart, operations for authenticating a hologram in accordance with certain embodiments.

FIG. 5 illustrates, in a flowchart, operations for authenticating a hologram in accordance with certain embodiments. Control begins at block 500 with the key embedded hologram processor 160 authenticating the user with biometrics associated with a user. In block 502, the key embedded hologram processor 160 receives a request and a hologram associated with the user, where the hologram is embedded with a first key phrase in accordance with a first sequence, and where the first sequence indicates which portions of the first key phrase are embedded in specific locations of the hologram. In block 504, the key embedded hologram processor 160 generates a second key phrase using a first seed and generate a second sequence using a second seed. In block 506, the key embedded hologram processor 160 determines whether portions of the second key phrase are embedded in specific locations of the hologram in accordance with the second sequence. If so, processing continues to block 508, otherwise, processing continues to block 512. In block 508, the key embedded hologram processor 160 displays the hologram. In block 510, the key embedded hologram processor 160 processes the request.

In block 512, the key embedded hologram processor 160 rejects the request (i.e., does not process the request). With embodiments, the request is rejected when the first key phrase does not match the second key phrase or when the second key phrase matches the second key phrase, but the second key phrase is not embedded in accordance with the second sequence.

Although embodiments herein describe a request and a hologram being sent together, in other embodiments, the request may be sent separately from the hologram.

In certain embodiments, the hologram authenticator 162 performs real time key phrase verification by detecting the embedded key phrase in the hologram on the front-end side (where the hologram is displayed) by vision institution devices (e.g., cameras that work with the hologram authenticator 162 and that are able to see the hologram and assist in analysis to authenticate the hologram).

In certain embodiments, the hologram authenticator 162 performs dynamic verification of one or more keys (e.g., of a key phrase) and the sequence, taking into consideration frequency (time) for regenerating the hologram, the key generation process, and the sequence generation process. Depending on the level of security desired, the key phrase may be multiple keys, and each of the keys may be embedded into different locations of the hologram.

Embodiments provide both a unique key, as well as a unique shape of the key phrase (i.e., a unique way in which the key phrase covers locations of the holograms).

In certain embodiments, the hologram generator 112 creates the hologram pixels using the key phrase and the sequence.

In certain embodiments, the key phrase is generated based on unique biometrics associated with a user or any secured user-based authentication techniques. In certain embodiments, the hologram represents the user while carrying out the transaction.

Embodiments dynamically and continuously authenticate a user's hologram, is being used to perform remote actions. These remote actions include, for example, performing bank transactions, participating in game streaming or game playing, purchasing items from a store, attending meetings, performing a concert, providing medical assistance (e.g., a doctor talking to a patient at home via a hologram), etc. With embodiments, holograms may be securely used in medical applications, financial applications, and other commercial applications. With embodiments, holograms may be securely used for digital holography microscopy for precise measurement.

Embodiments generate a digital key, where the digital key is authenticated to authorize transactions. The digital key is integrated into a hologram (i.e., into a pattern used to create the hologram, and, so into the "DNA" of the hologram). The hologram is transmitted to a location to carry out a transaction. The digital key is authenticated by analyzing the hologram. In response to authenticating the digital key, the transaction at the location is authorized.

FIG. 6 illustrates a computing environment in accordance with certain embodiments. In certain embodiments, the initiating device 100, the cloud node 140, and/or the destination device 150 has the architecture of computer 601.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, such as continuous authentication for a real time hologram code 700. In addition to block 700, computing environment 600 includes, for example, computer 601, wide area network (WAN) 602, end user device (EUD) 603, remote server 604, public cloud 605, and private cloud 606.

In this embodiment, computer 601 includes processor set 610 (including processing circuitry 620 and cache 621), communication fabric 611, volatile memory 612, persistent storage 613 (including operating system 622 and block 700, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 700 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 700 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

Additional Embodiment Details

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

Examples

The foregoing description provides examples of embodiments of the invention, and variations and substitutions may be made in other embodiments. Several examples will now be provided to further clarify various aspects of the present disclosure:

Example 1: A method comprising receiving a request and a hologram, wherein the hologram is embedded with a first key phrase in accordance with a first sequence, and wherein the first sequence indicates which portions of the first key phrase are embedded in specific locations of the hologram. The method further comprises retrieving a first seed and a second seed. The method further comprises generating a second key phrase using the first seed. The method further comprises generating a second sequence using the second seed. The method further comprises determining whether portions of the second key phrase are embedded in specific locations of the hologram in accordance with the second sequence. The method further comprises, in response to determining that the portions of the second key phrase are embedded in specific locations of the hologram in accordance with the second sequence, displaying the hologram and processing the request. The method further comprises, in response to determining that the portions of the second key phrase are not embedded in specific locations of the hologram in accordance with the second sequence, rejecting the request.

Example 2: The limitations of any of Examples 1 and 3-7, wherein the method further comprises determining that it is time to generate a new hologram. The method further comprises generating a new key phrase using the first seed. The method further comprises generating a new sequence using the second seed. The method further comprises receiving a new hologram. The method further comprises authenticating the new hologram by determining that portions of the new key phrase are embedded in specific locations of the new hologram in accordance with the new sequence.

Example 3: The limitations of any of Examples 1-2 and 4-7, wherein the hologram is associated with a user, and wherein the request and the hologram are received at a remote device that is geographically remote from the user.

Example 4: The limitations of any of Examples 1-3 and 5-7, wherein the method further comprises authenticating a user with biometrics associated with the user, wherein the hologram is associated with the user.

Example 5: The limitations of any of Examples 1-4 and 6-7, wherein the hologram is periodically regenerated.

Example 6: The limitations of any of Examples 1-5 and 7, wherein the first seed and the second seed are generated by a cloud service of a cloud node.

Example 7: The limitations of any of Examples 1-6, wherein other requests are processed while the hologram is authenticated.

Example 8: A computer program product, the computer program product comprising a computer readable storage medium having program code embodied therewith, the program code executable by at least one processor to perform a method according to any one of Examples 1-7.

Example 9: A computer system comprising one or more processors, one or more computer-readable memories and one or more computer-readable, tangible storage devices, and program instructions, stored on at least one of the one or more computer-readable, tangible storage devices for execution by at least one of the one or more processors via at least one of the one or more computer-readable memories, to perform a method according to any of Examples 1-7.

What is claimed is:

1. A computer-implemented method, comprising operations for:
receiving a request and a hologram, wherein the hologram is embedded with a first key phrase in accordance with a first sequence, and wherein the first sequence indicates which portions of the first key phrase are embedded in specific locations of the hologram;
retrieving a first seed and a second seed;
generating a second key phrase using the first seed;
generating a second sequence using the second seed;
determining whether portions of the second key phrase are embedded in specific locations of the hologram in accordance with the second sequence;
in response to determining that the portions of the second key phrase are embedded in specific locations of the hologram in accordance with the second sequence, displaying the hologram; and
processing the request; and
in response to determining that the portions of the second key phrase are not embedded in specific locations of the hologram in accordance with the second sequence, rejecting the request.

2. The computer-implemented method of claim 1, further comprising operations for:
determining that it is time to generate a new hologram;
generating a new key phrase using the first seed;
generating a new sequence using the second seed;
receiving the new hologram; and authenticating the new hologram by determining that portions of the new key phrase are embedded in specific locations of the new hologram in accordance with the new sequence.

3. The computer-implemented method of claim 1, wherein the hologram is associated with a user, and wherein the request and the hologram are received at a remote device that is geographically remote from the user.

4. The computer-implemented method of claim 1, further comprising operations for:
authenticating a user with biometrics associated with the user, wherein the hologram is associated with the user.

5. The computer-implemented method of claim 1, wherein the hologram is periodically regenerated.

6. The computer-implemented method of claim 1, wherein the first seed and the second seed are generated by a cloud service of a cloud node.

7. The computer-implemented method of claim 1, wherein other requests are processed while the hologram is authenticated.

8. A computer program product, the computer program product comprising a computer readable storage medium having program code embodied therewith, the program code executable by at least one processor to perform operations for:
receiving a request and a hologram, wherein the hologram is embedded with a first key phrase in accordance with a first sequence, and wherein the first sequence indicates which portions of the first key phrase are embedded in specific locations of the hologram;
retrieving a first seed and a second seed;
generating a second key phrase using the first seed;
generating a second sequence using the second seed;
determining whether portions of the second key phrase are embedded in specific locations of the hologram in accordance with the second sequence;
in response to determining that the portions of the second key phrase are embedded in specific locations of the hologram in accordance with the second sequence, displaying the hologram; and
processing the request; and
in response to determining that the portions of the second key phrase are not embedded in specific locations of the hologram in accordance with the second sequence, rejecting the request.

9. The computer program product of claim 8, wherein the program code is executable by the at least one processor to perform operations for:
determining that it is time to generate a new hologram;
generating a new key phrase using the first seed;
generating a new sequence using the second seed;
receiving the new hologram; and
authenticating the new hologram by determining that portions of the new key phrase are embedded in specific locations of the new hologram in accordance with the new sequence.

10. The computer program product of claim 8, wherein the hologram is associated with a user, and wherein the request and the hologram are received at a remote device that is geographically remote from the user.

11. The computer program product of claim 8, wherein the program code is executable by the at least one processor to perform operations for:
authenticating a user with biometrics associated with the user, wherein the hologram is associated with the user.

12. The computer program product of claim 8, wherein the hologram is periodically regenerated.

13. The computer program product of claim 8, wherein the first seed and the second seed are generated by a cloud service of a cloud node.

14. The computer program product of claim 8, wherein other requests are processed while the hologram is authenticated.

15. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

receiving a request and a hologram, wherein the hologram is embedded with a first key phrase in accordance with a first sequence, and wherein the first sequence indicates which portions of the first key phrase are embedded in specific locations of the hologram;

retrieving a first seed and a second seed;

generating a second key phrase using the first seed;

generating a second sequence using the second seed;

determining whether portions of the second key phrase are embedded in specific locations of the hologram in accordance with the second sequence;

in response to determining that the portions of the second key phrase are embedded in specific locations of the hologram in accordance with the second sequence, displaying the hologram; and processing the request; and in response to determining that the portions of the second key phrase are not embedded in specific locations of the hologram in accordance with the second sequence, rejecting the request.

16. The computer system of claim 15, wherein the operations further comprise:

determining that it is time to generate a new hologram;

generating a new key phrase using the first seed;

generating a new sequence using the second seed;

receiving the new hologram; and authenticating the new hologram by determining that portions of the new key phrase are embedded in specific locations of the new hologram in accordance with the new sequence.

17. The computer system of claim 15, wherein the hologram is associated with a user, and wherein the request and the hologram are received at a remote device that is geographically remote from the user.

18. The computer system of claim 15, wherein the operations further comprise:

authenticating a user with biometrics associated with the user, wherein the hologram is associated with the user.

19. The computer system of claim 15, wherein the hologram is periodically regenerated.

20. The computer system of claim 15, wherein the first seed and the second seed are generated by a cloud service of a cloud node.

* * * * *